United States Patent [19]

Brown et al.

[11] Patent Number: 5,710,909
[45] Date of Patent: Jan. 20, 1998

[54] DATA COMPRESSION UTILIZATION METHOD AND APPARATUS FOR COMPUTER MAIN STORE

[75] Inventors: Jeffrey Douglas Brown; Scott Douglas Clark; Michael Joseph Corrigan, all of Rochester; Kent Harold Haselhorst, Byron; Larry Wayne Loen, Rochester, all of Minn.

[73] Assignee: International Business Machines Corporation, Armonk, N.Y.

[21] Appl. No.: 590,134

[22] Filed: Jan. 23, 1996

[51] Int. Cl.[6] ............................................ G06F 12/00
[52] U.S. Cl. ............................ 395/497.01; 395/621
[58] Field of Search ................................. 395/621, 622, 395/497.01, 497.02, 497.03, 497.04

[56] References Cited

U.S. PATENT DOCUMENTS

| | | | |
|---|---|---|---|
| 4,554,597 | 11/1985 | Sugiyama et al. | 386/112 |
| 4,884,147 | 11/1989 | Arimoto et al. | 358/443 |
| 4,989,134 | 1/1991 | Shaw | 395/622 |
| 5,313,604 | 5/1994 | Godwin | 395/489 |
| 5,374,916 | 12/1994 | Chu | 340/146.2 |
| 5,390,299 | 2/1995 | Rege et al. | 395/250 |
| 5,394,534 | 2/1995 | Kulakowski et al. | 395/439 |
| 5,455,576 | 10/1995 | Lempel et al. | 341/50 |
| 5,506,872 | 4/1996 | Mohler | 375/240 |
| 5,535,369 | 7/1996 | Wells et al. | 395/497.02 |

FOREIGN PATENT DOCUMENTS

| | | |
|---|---|---|
| 0585524A1 | 3/1994 | European Pat. Off. . |
| 7-056814 | 3/1995 | Japan . |

OTHER PUBLICATIONS

IBM Technical Disclosure Bulletin, P.Mundy and D.R.Page, "Storage Compression Algorithm", Nov. 1986, vol. 29, No. 6, pp.2371–2373.

*Primary Examiner*—Matthew M. Kim
*Attorney, Agent, or Firm*—Joan Pennington

[57] ABSTRACT

A data compression utilization method and apparatus are provided for a computer main store. An amount of unused memory in the computer system main store is dynamically calculated and compared with a plurality of predefined threshold values. One interrupt of a plurality of predefined interrupts is selectively generated responsive to the compared values. Then the usage of the computer system main store is adjusted responsive to the generated interrupt.

10 Claims, 3 Drawing Sheets

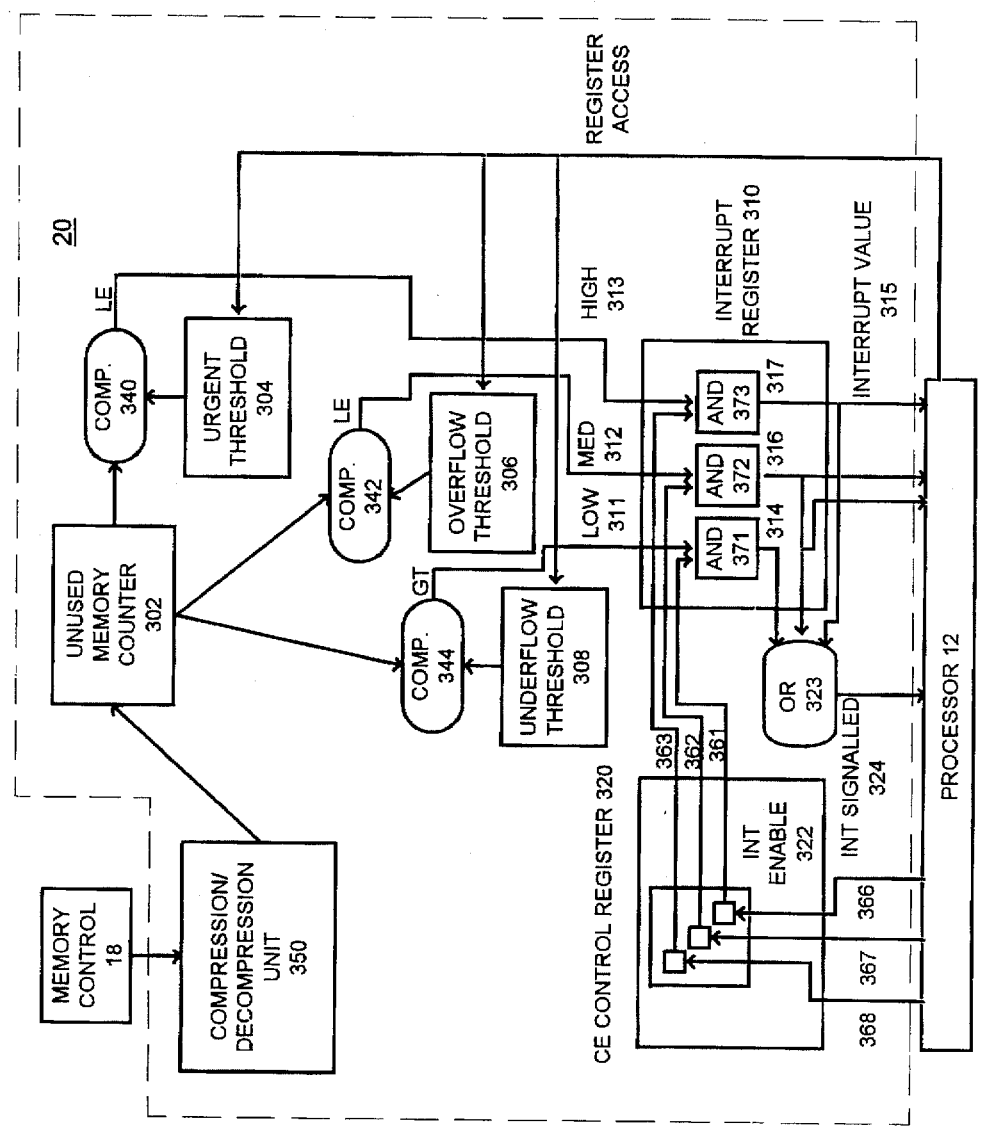

DATA COMPRESSION UTILIZATION METHOD AND APPARATUS FOR COMPUTER MAIN STORE

FIELD OF THE INVENTION

The present invention relates to a data compression utilization method and apparatus for a computer main storage or store.

DESCRIPTION OF THE PRIOR ART

Computers and computer systems include a main memory or store that advantageously store data in a compressed format. However, different data compression utilization solutions than used for direct access storage devices (DASDs) are required. DASD data compression is not real time and the available DASD storage space is not typically fully used.

When data compression is used, the physical size necessary to store the compressed representation of the data is unknown. It depends on the exact data and order of data that is being compressed. When compression is used for storing data in a computer's main store tradeoffs exist between maximizing memory utilization and minimizing system failures.

First, it is desirable for the main store to present a real address space as large as possible. This is done by estimating the compression ratio or uncompressed data size/compressed data size to be at least as large as can actually be achieved. This implies that all of the main store will be utilized and none will be wasted due to having a smaller than necessary real address space. A large real address space improves system performance, but it must be mapped to a physical address space.

The physical address space is limited by the amount of memory that is installed in the system. The physical address space is a fixed size; however, as the compression ratio will change dynamically, the true amount of real memory is variable also. Operating systems are designed to handle fixed sizes of real memory. When an access to memory cannot be handled, this can cause a system outage. As a result, it is highly undesirable for an access to a real address not be translatable to a physical address for any reason.

If the estimated compression ratio is set too high, there is a higher probability that there will not be a physical address for each real address. If the estimated compression ratio is set too low, there will be no significant gain made by using main store compression.

SUMMARY OF THE INVENTION

Important objects of the present invention are to provide an improved data compression utilization method and apparatus for a computer main storage or store; to provide such method and apparatus that maximizes the utilization of memory compression while keeping the chance of failure to acceptable levels; and to provide such method and apparatus that overcome many of the disadvantages of prior art arrangements.

In brief, a data compression utilization method and apparatus for a computer main store are provided. An amount of unused memory in the computer system main store is dynamically calculated and compared with a plurality of predefined threshold values. One interrupt of a plurality of predefined interrupts is selectively generated responsive to the compared values. Each of the predefined interrupts is handled in order to adjust memory usage. The usage of the computer system main store is adjusted responsive to the particular generated interrupt.

BRIEF DESCRIPTION OF THE DRAWINGS

The present invention together with the above and other objects and advantages may best be understood from the following detailed description of the preferred embodiments of the invention illustrated in the drawings, wherein:

FIG. 3 is a more detailed view of the compression engine of the computer system of FIG. 1A.

DETAILED DESCRIPTION OF THE PREFERRED EMBODIMENTS

Figure 1A:
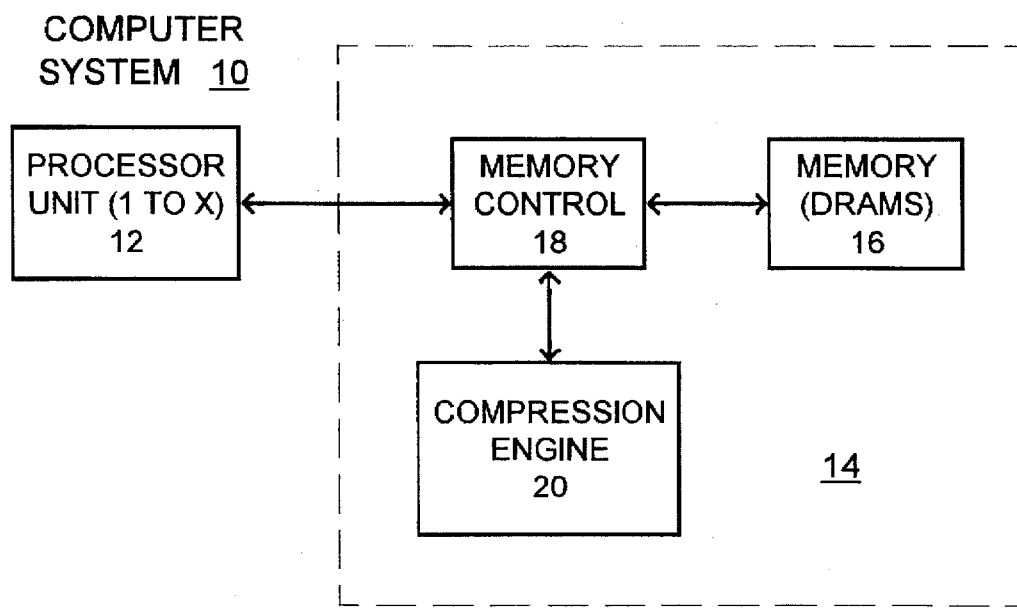
FIG. 1A is a block diagram illustrating a computer system for implementing a data compression utilization method in accordance with the present invention.

Referring now to the drawings, in FIG. 1A there is illustrated a block diagram representation of an exemplary system generally designated by 10 for performing a data compression utilization method of the invention. As illustrated, the exemplary system 10 includes at least one data processor unit 12 (1 to X) generally designated by 12. Processor unit 12 is coupled to a main store subsystem generally designated by 14. The main store subsystem 14 includes a memory controller 18 operatively coupled to a main memory store 16 for storing compressed data and a compression engine 20 operatively coupled to the memory controller 18. Processor 12 is also coupled to the compression engine 20 via the memory controller 18 to read and write certain control information. The main memory store 16 typically comprises dynamic random access memory (DRAM).

Figure 1B:
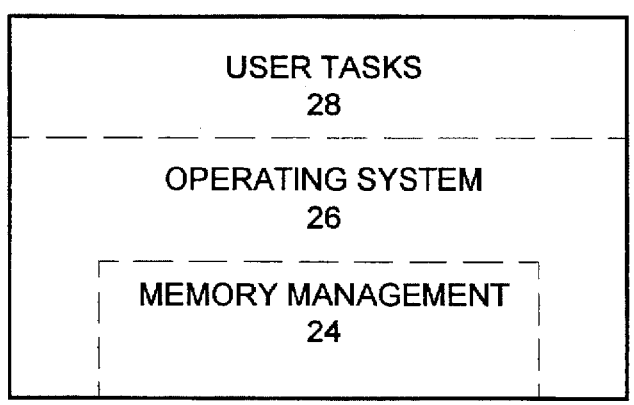
FIG. 1B is a block diagram illustrating a data compression software structure for the system of FIG. 1A.

In FIG. 1B, there is shown a software structure generally designated by 22 for the system 10. The software structure 22 includes a memory management function 24, an operating system 26 and user tasks 28.

Figure 2:
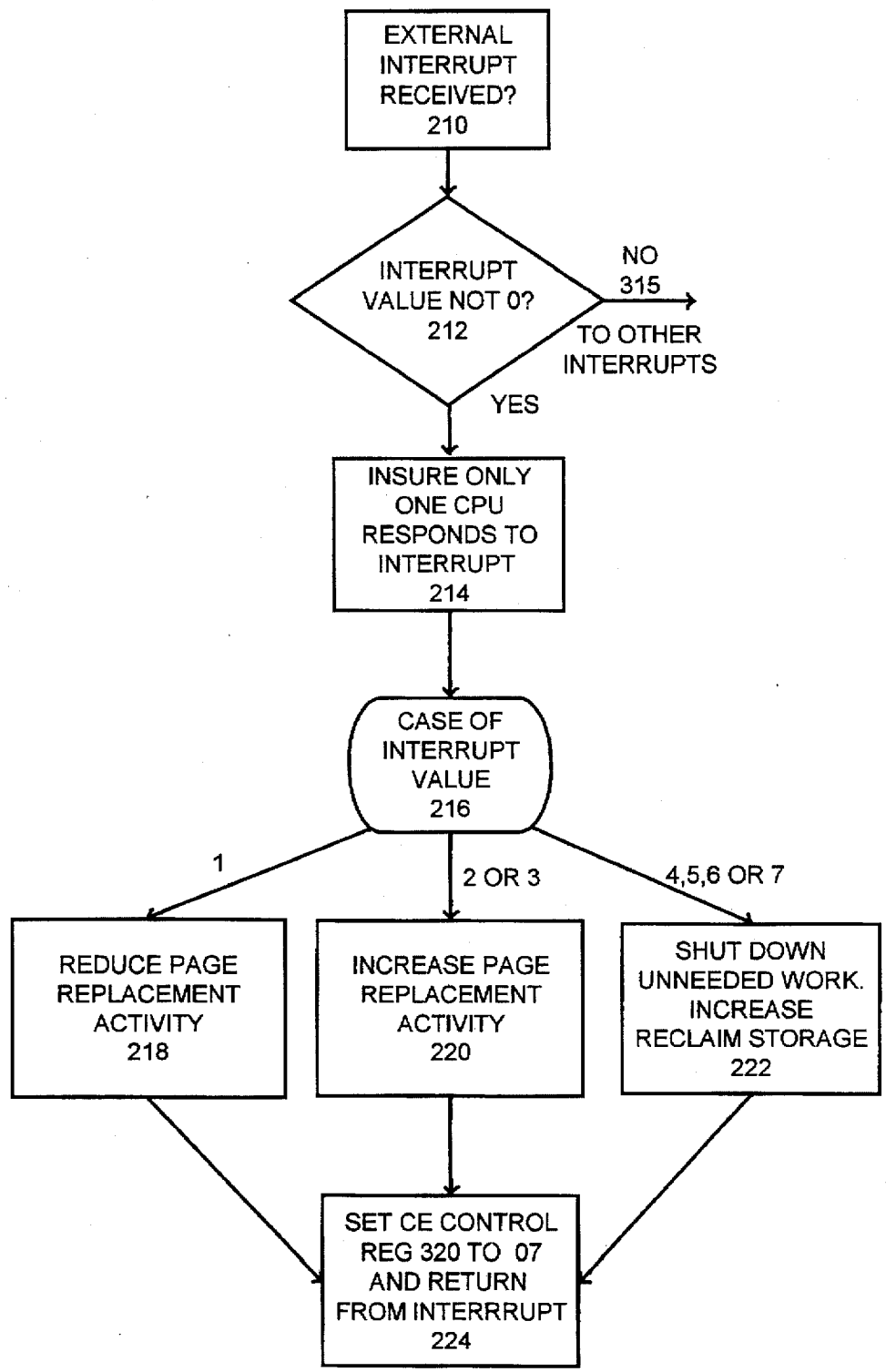
FIG. 2 is a logic diagram illustrating how the software structure of FIG. 1B handles interrupts from a compression engine of the computer system of FIG. 1A.

In accordance with the method of the invention, the utilization of memory compression is maximized while the chance of catastrophic failure is kept to acceptable levels. The invention uses a combination of hardware of system 10 and of software 22 as shown in FIGS. 2 and 3. An interface in the form of interrupts is provided from hardware 10 to software 22. The interrupts present information to the software 22 regarding the current utilization of the physical main store 16. Data processing unit 12 is directed by the predetermined interrupts to temporarily suspend its present process to run a predefined routine corresponding to a particular interrupt for adjusting the usage of the computer system main store 16. After the predefined routine for the particular interrupt is completed, the data processing unit 12 resumes its original work.

As shown in FIGS. 2 and 3, predefined interrupts are represented by a plurality of lines 314, 316, 317 that together define a predetermined interrupt value 315 in FIG. 3 and a case of a received external interrupt value is identified at a block 216 in FIG. 2. The interrupts 314, 316, 317 are implemented including a memory overflow interrupt 316 indicating that the main store 16 is over utilized, a memory underflow interrupt 314 indicating that the main store 16 is not fully utilized, and an urgent memory overflow interrupt 317 indicating that the main store 16 is over utilized and that the main store 16 is nearly full.

Referring now to FIG. 3, an expanded view of the compression engine 20 is provided. Compression engine (CE) 20 includes a compression/decompression unit 350, an unused memory counter 302, multiple external multi-byte registers including an urgent threshold 304, an overflow threshold 306 and an underflow threshold 308, a plurality of comparators 340, 342 and 344, an interrupt register 310 and a CE control register 320. Unused memory counter 302 indicates how much physical storage remains available; thus if the compression ratio is high, the unused memory counter value will be higher than for a lower compression ratio.

The multi-byte registers 304, 306, 308 are readable and writable from processor 12 as indicated at a line labeled REGISTER ACCESS. An input from the unused memory counter 302 and an input from a respective one of the multi-byte registers 304, 306, 308 are applied to the comparators 340, 342 and 344. The comparators 340, 342 and 344 are typical multi-byte comparators of a size as required by the registers 302, 304, 306, 308. An output line 311 of comparator 344 labeled GT is true when unused memory 302 is greater than the underflow register 308. An output line 312 of comparator 342 labeled LE is true when unused memory 302 is less than or equal to the overflow threshold register 306. An output line 313 of comparator 340 labeled LE is true when unused memory 302 is less than or equal to the urgent threshold register 304.

Interrupt register 310 returns values as indicated at interrupt value 315 of the interrupt requests at lines 311, 312 and 313 as modified by the interrupt enable lines 361, 362 and 363 from the CE register 320 using three AND gates 371, 372 and 373. Interrupt value 315 is collectively readable as an I/O register or other suitable memory access from processor(s) 12. Interrupt value 315 can be, by convention, the value of the outputs of AND gates 373, 372 and 371 such that their output lines 317, 316 and 314 represent the high order to low order bit of interrupt value 315. For example, if 317 is 1 and 316 and 314 are zeros, the hexadecimal value of Interrupt Value 315 is 04. The individual AND gate outputs at lines 317, 316 and 314 also are applied to an OR gate 323, which produces an interrupt to the processor 12 as indicated at the OR output line labeled INT SIGNALLED 324.

CE control register 320 includes programmable latches 322 having individual input lines labeled 368, 367 and 366 and output lines labeled 363, 362 and 361. The latches 322 are at least writable by processor(s) 12 as I/O registers or other suitable memory access. IntEnable 322, by convention, can be written as a register with its high order bit being 368, its middle bit 367 and its low order bit 366. Since the output lines 363, 362 and 361 of latches 322 feed the AND gates 373, 372 and 371, respectively, it follows that these lines enable or disable interrupts from 313 (urgent interrupt), 312 (overflow interrupt) and 311 (underflow interrupt), from high order bit to low order bit, since setting the line to 0 will ensure that 373, 372 or 371, respectively, is zero.

FIG. 2 shows how the software system 22 and compression engine 20 communicate and process interrupts in accordance with the present invention. When external interrupts are enabled, the software system 22 executes the sequential functions of FIG. 2. In FIG. 2, at a block 210, control is received for an arbitrary external interrupt and sufficient state is saved to begin interrupt processing. Since main storage compression would likely be an important interrupt for system performance of the computer system 10, this embodiment shows an immediate check of an interrupt value to determine if the interrupt value 315 is from the compression engine 20 as indicated at a decision block 212. If the interrupt value 315 is a 0, then the interrupt is not from compression engine 20, so existing prior art interrupt handling for processor 12 is invoked. If interrupt value 315 is not zero, then there is an interrupt signalled by compression engine 20. Since the detailed processing might be quite lengthy, possibly involving hard disk operations, software 22 can disable further interrupts by writing the value zero to IntEnable 322 before re-enabling external interrupts.

Several possibilities are represented by a block 214. If the hardware 10 is arranged to deliver the IntSignalled 324 line to one processor 12, no processing is needed at block 214. If the IntSignalled 324 is delivered to multiple processors 12 in a multiprocessor configuration for system 10, then any suitable means, for example, a test-and-set instruction, can be used to insure that one processor 12 discovers that it owns the interrupt and goes on to block 216, while the other processors 12 exit the interrupt without further processing. In the multiprocessor configuration, a type of semaphore is set by the owning processor 12 at block 214 and cleared at a block 224 with completion of the interrupt processing by the owning processor.

Interrupt value 315 identified at block 212 is remembered and at a block 216 appropriate software processing will be invoked based on that remembered value. Block 216 represents a software case statement where the next block executed is based on the remembered value of interrupt value 315. As shown in FIG. 2, a value 1 causes a block 218 to be invoked. A value of 2 or 3 causes a block 220 to be invoked. A value of 4, 5, 6, or 7 causes a block 222 to be invoked. This priority encoded checking individual bits of interrupt value 315 provides that urgent interrupts 313 (317) are serviced ahead of overflow interrupts 312 (316) and those, in turn, are serviced ahead of underflow interrupts 311 (314).

With the underflow interrupt 314 on and the other interrupts 316 and 317 off, block 218 is reached. This means that too much main storage 16 is being wasted so that storage utilization should be increased. Block 218 invokes suitable programs to increase main storage use. Conventional arrangements for adjusting page utilization are extensive and the software system 22 can arrange, among other things, to run more jobs to increase its workload, or reduce the rate at which the paging subsystem preemptively ejects pages from main storage 16 to an auxiliary storage (not shown). This should cause more main storage consumption and, eventually, may increase the use of physical main store 16.

With overflow interrupt 316 on and the urgent interrupt 317 off, block 220 is reached. This means that main store 16 is getting overcommitted. That is, while the system 10 still is thought to be healthy, the amount of main storage 16 being used is approaching a level that, if left untended, might eventually reach the urgent threshold 304. Software at block 220, again using conventional techniques can reduce the main store load by either suspending jobs temporarily or by changing parameters on the paging subsystem to have it eliminate more active pages and thus allow the eliminated pages to be zeroed out, while awaiting reassignment. The key is that explicit action is provided to take real pages away from executing programs, write them to hard file or other backing store if necessary, and then zero them out to improve compression in the system 10. Zeroing of pages in the main storage 16 is provided to make the memory space of the eliminated pages available for storing other compressed data pages.

With the urgent interrupt 317 on, block 222 is reached. This means storage 16 is near exhaustion. Too many jobs are creating a physical store whose size is much too close to exceeding the available physical store and an outage is reasonably imminent. Software at block 222 takes energetic action, such as terminating unessential jobs, suspending work, calling the machine operator for assistance and the like. As at block 220, the zeroing of storage will increase redundancy and improve compression in the system 10.

Note that this embodiment effectively multiplexes three interrupts 311, 312, 313 into a single external interrupt 315 and then successfully demultiplexes the three interrupts 311, 312, 313 in the interrupt handling.

At a block 224, interrupts 314, 316 and 317 from interrupt register 310 are reenabled by setting CE Register 320 to 7. Processor 12 will then return from interrupt, which might cause the particular interrupt to be immediately reinvoked in some particularly difficult cases.

This is a race condition, but race conditions are not new for paging subsystems. Thus, this issue is simply another form of the pacing questions that paging subsystems already commonly deal with in the art. The paging subsystem and compression engine 20 must cooperatively ensure that the various thresholds 304, 306, and 308 permit the paging subsystem to keep up with increases in physical storage consumption. Except for potential differences in consumption rate caused by compression, no novel problems occur over prior art and the thresholds are designed to keep the pacing correctly bounded.

It should also be pointed out that while ordinary zeroing of pages by programming could be employed, the prior art compression system may also provide special operations to eliminate this process and ensure ready realization of the relinquishing of the pages. However this is accomplished, the zeroing operation will affect unused memory counter of the prior art and so, if software succeeds, reducing at block 218 or increasing at blocks 220, 222, of the unused memory counter 302 value enough to alleviate the interrupt condition so interrupts can be reenabled.

Processor(s) 12 establishes the thresholds 304, 306, and 308. In a practical system, the values need not be updated frequently. It is presumed throughout that in a running system 10, the urgent threshold 304 is greater than or equal to overflow threshold 306 and that is in turn greater than or equal to underflow threshold 308.

The method of FIG. 2 shows a simple illustrative embodiment. Those skilled in the art could readily add other features, such as individually enabling or disabling the various interrupts, or allowing multiple processors to concurrently service blocks 218, 220, or 222 instead of having one processor perform the work and the like, using conventional techniques known in the art.

Since the results of FIGS. 2 and 3 are effectively a never-ending loop, the initial conditions bear disclosure.

Memory Controller 18 initially works with compression effectively off. This permits standard initial program load to occur as on machines with no compression. The initial value of the CE control register 320 is zero on machine reset, with the various registers 302, 304, 306, and 308 arbitrary. Software system 22 would not look at interrupt value 315 until the compression engine 20 was enabled.

Conventional techniques can be used for initialization for data compression that produce a real result, for example, compressed main storage 16 on the actual machine or system 10. The initialization results can be used, possibly with past information, to establish the initial values of the threshold registers 304, 306 and 308. Then, a conventional initialization process occurs where compression engine 20 utilizes compressed data encoding. Thereafter, the processor 12 sets CE control register 320 to either 00, or 07, as required (eventually to 07) and the continuous monitoring of usage of main store 16 begins.

It should be understood that the concept of the present invention to communicate the current utilization status of the physical main storage is not restricted to the use of three interrupt levels. For example, another implementation might have three levels of over-utilization status and two levels of under-utilization status thus allowing the software finer control. With another implementation including additional threshold levels, additional corresponding adjustment routines for the additional corresponding interrupts would be used for controlling the utilization of the main store 16.

While the present invention has been described with reference to the details of the embodiments of the invention shown in the drawing, these details are not intended to limit the scope of the invention as claimed in the appended claims.

What is claimed is:

1. An apparatus for utilizing data compression in a computer system main store comprising:
   means for dynamically calculating an amount of unused memory in the computer system main store and for comparing the calculated amount with a plurality of predefined threshold values;
   means responsive to said compared values for selectively generating one interrupt of a plurality of predefined interrupts; and
   means responsive to said generated interrupt for adjusting the usage of the computer system main store.

2. An apparatus as recited in claim 1 wherein said plurality of predefined threshold values include an urgent memory overflow threshold value, a memory overflow threshold value, and a memory underflow threshold value.

3. An apparatus as recited in claim 1 wherein said plurality of predefined interrupts include an urgent memory overflow interrupt, a memory overflow interrupt, and a memory underflow interrupt.

4. An apparatus as recited in claim 1 wherein said means responsive to said generated interrupt for adjusting the usage of the computer system main store include means responsive to a predefined memory overflow interrupt for deallocating memory pages to lower the usage of the computer system main store.

5. An apparatus as recited in claim 1 wherein said means responsive to said generated interrupt for adjusting the usage of the computer system main store include means responsive to a predefined memory underflow interrupt for reallocating memory pages to increase the usage of the computer system main store.

6. An apparatus as recited in claim 1 wherein said means responsive to said generated interrupt for adjusting the usage of the computer system main store include means responsive to a predefined urgent memory overflow interrupt for deallocating memory pages to lower the usage of the computer system main store and further includes means for suspending selected tasks until said generated urgent memory overflow interrupt is cleared.

7. A method for utilizing data compression in a computer system main store, said method comprising the steps of:
   dynamically calculating an amount of unused memory in the computer system main store and comparing the calculated amount with a plurality of predefined threshold values;

selectively generating one interrupt of a plurality of predefined interrupts responsive to said compared values; and adjusting the usage of the computer system main store responsive to said generated interrupt.

8. A method for utilizing data compression in a computer system main store as recited in claim 7 wherein said step of adjusting the usage of the computer system main store responsive to said generated interrupt includes the steps of deallocating memory pages to lower the usage of the computer system main store responsive to a predefined memory overflow interrupt.

9. A method for utilizing data compression in a computer system main store as recited in claim 7 wherein said step of adjusting the usage of the computer system main store responsive to said generated interrupt includes the steps of reallocating memory pages to increase the usage of the computer system main store responsive to a predefined memory underflow interrupt.

10. A method for utilizing data compression in a computer system main store as recited in claim 7 wherein said step of adjusting the usage of the computer system main store responsive to said generated interrupt includes the steps of deallocating memory pages to lower the usage of the computer system main store responsive to a predefined urgent memory overflow interrupt and suspending selected tasks until said generated urgent memory overflow interrupt is cleared.

* * * * *